United States Patent
Schulze et al.

(10) Patent No.: US 7,319,380 B2
(45) Date of Patent: Jan. 15, 2008

(54) DEVICE FOR THE MONITORING AND WIRELESS SIGNALING OF A PRESSURE OR A CHANGE OF PRESSURE IN PNEUMATIC TIRES

(76) Inventors: Gunter Schulze, Lutherstrasse 3, 75228 Ispringen (DE); Markus Neumann, Jahnstrasse 19, 68259 Mannheim (DE)

( * ) Notice: Subject to any disclaimer, the term of this patent is extended or adjusted under 35 U.S.C. 154(b) by 97 days.

(21) Appl. No.: 10/523,314

(22) PCT Filed: Jul. 29, 2003

(86) PCT No.: PCT/EP03/08349

§ 371 (c)(1),
(2), (4) Date: Feb. 1, 2005

(87) PCT Pub. No.: WO2004/012948

PCT Pub. Date: Feb. 12, 2004

(65) Prior Publication Data

US 2006/0022813 A1 Feb. 2, 2006

(30) Foreign Application Priority Data

Aug. 1, 2002 (DE) .................. 102 35 127

(51) Int. Cl.
*B60C 23/00* (2006.01)
(52) U.S. Cl. ...................... 340/447; 340/442
(58) Field of Classification Search ............ 340/442, 340/445, 446, 447, 448, 539.11, 539.22, 539.23; 73/146.2, 146.4, 146.5, 146.8; 116/34 R
See application file for complete search history.

(56) References Cited

U.S. PATENT DOCUMENTS

| | | | | |
|---|---|---|---|---|
| 4,450,431 A | * | 5/1984 | Hochstein | .................. 340/447 |
| 6,369,712 B2 | * | 4/2002 | Letkomiller et al. | ..... 340/572.1 |
| 6,400,261 B1 | * | 6/2002 | Starkey et al. | ............... 340/442 |
| 6,591,671 B2 | * | 7/2003 | Brown | ...................... 73/146.5 |
| 6,756,892 B2 | * | 6/2004 | Konchin et al. | ............ 340/447 |
| 6,791,457 B2 | * | 9/2004 | Shimura | ...................... 340/448 |
| 6,829,926 B2 | * | 12/2004 | Cantu et al. | ............... 73/146.4 |

FOREIGN PATENT DOCUMENTS

| | | |
|---|---|---|
| DE | 68913900 | 6/1994 |
| DE | 19735686 | 2/1999 |
| DE | 19939936 | 3/2001 |
| EP | 1197356 | 4/2002 |
| EP | 1211104 | 6/2002 |

* cited by examiner

Primary Examiner—Van T. Trieu

(57) ABSTRACT

A system for the monitoring and wireless signaling of a pressure or a change of pressure in pneumatic tires on vehicles, comprising wheel electronics that are disposed inside the pneumatic tire and are provided with a battery as a power source, with a pressure sensor for measuring the pressure or the change of pressure, with a RF-transmitter for transmitting a signal derived from the signal of the pressure sensor, and with a (first) receiver for receiving wireless interrogation signals and/or control signals, a (second) receiver which is arranged in or on the vehicle and which receives the signal derived from the signal of the pressure sensor, a device for signaling to the driver information relating to the pressure or change of pressure, and transmitters for emitting interrogation signals and/or control signals, the transmitters being disposed, respectively, individually near each running wheel and having a transmission frequency of less than 1 MHz.

20 Claims, 1 Drawing Sheet

DEVICE FOR THE MONITORING AND WIRELESS SIGNALING OF A PRESSURE OR A CHANGE OF PRESSURE IN PNEUMATIC TIRES

SPECIFICATION AS AMENDED

This application claims the priority to International Application number PCT/EP03/08349 filed on 29 Jul. 2003 and Application number 10235127.9 filed on Feb. 1, 2002 with the German Patent Office.

BACKGROUND OF THE INVENTION

1. Field of the Invention

The invention relates to a system for the monitoring and wireless signaling of a pressure or a change of pressure in pneumatic tires on vehicles.

2. Description of Related Art

Prior art systems for monitoring pressure in pneumatic tires comprises a device with an electronic circuit, hereinafter referred to as wheel electronics, disposed inside the pneumatic tire and exposed to the pressure prevailing in that tire. The wheel electronics comprise a battery as a power source, a pressure sensor for measuring the pressure prevailing in the pneumatic tire, a transmitter for transmitting information relating to the pressure or the change of pressure, and a receiver for receiving wireless interrogation and/or control signals.

Given the fact that battery changes are either impossible with such wheel electronics or possible only at significant cost, it is desirable to operate the wheel electronics in the best energy-saving fashion possible. Especially, it is desired to have a battery whose service life is as far as possible identical to the service life of the vehicle. It is one object of the present invention to provide wheel electronics with a long life. If the wheel electronics are caused to emit pressure or pressure change signals by wireless interrogation and/or control signals emitted by an interrogation transmitter, it can be ensured that the especially energy-intensive transmission of information on the prevailing pressure or change of pressure is performed only at times when such information is really needed. It is then possible to provide, for example, that no pressure data are transmitted when the vehicle is parked, and that the transmission rate is adapted to the vehicle speed. By controlling the wheel electronics via interrogation and/or control signals it is possible in this way to achieve especially energy-saving operation of the wheel electronics. The use of a lithium battery, having the dimensions of a button cell, then permits service lives of seven years or over to be achieved.

Apart from the desire to achieve the best possible energy-saving operation, the clear and—when a tire has been changed—rapid association of the wheel electronics to the position of their associated wheel on the vehicle presents a permanent problem. DE 197 35 686 A1 proposes for this purpose to have the wheel electronics simultaneously detect and evaluate the path acceleration and the Korreolis acceleration of the respective wheel. That publication explains in detail that it is possible in this way to differentiate between steered front wheels and unsteered rear wheels, as well as between left wheels and right wheels. Together with measuring signals relating to the pressure or a pressure change, the path acceleration and the centrifugal acceleration, each wheel electronics transmit in this case also an identifying signal characteristic for it. Using the respective identifying signals, an evaluation circuit arranged in or on the vehicle can then automatically associate the different wheel electronics to the respective wheel positions by statistical evaluation of the centrifugal acceleration and the path acceleration. When a wheel has been mounted on the vehicle for the first time, or else after a change of a wheel, the evaluation unit therefore automatically learns which wheel electronics belong to which wheel position.

However, it is a disadvantage of the method disclosed by DE 197 35 686 A1 that following a change of a tire, for example, several minutes of driving are required until it can be derived from the centrifugal and path acceleration values measured which identifying signal relates to a given wheel position.

SUMMARY OF THE INVENTION

Now, it is the object of the present invention to open up a way of associating identifying signals of wheel electronics to the respective wheel positions more rapidly, without sacrificing the energy-saving operation of the wheel electronics arranged in the respective vehicle tires.

Instead of designing the transmitter for the transmission of interrogation and/or control signals—hereinafter referred to as the interrogation transmitter—as well as the transmitter provided in the wheel electronics as a high-frequency transmitter (for example in Germany in the 433 MHz range, in the USA in the 315 MHz range), the interrogation transmitter according to the invention has a transmission frequency of less than 1 MHz, preferably in the frequency range of 50 to 300 kHz, more preferably in the range of 70 to 150 kHz. This feature provides the advantage that a magnetic component of an emitted radio signal has largely died down already at a distance of 0.5 to 1 m so that no additional measures are required for preventing the wheel electronics of a different vehicle from responding. By providing a separate interrogation transmitter for each wheel of the vehicle, for example in the respective wheel case, it is now possible to operate the different wheel electronics arranged in the different wheels of the vehicle individually via the interrogation transmitter arranged in them, respectively. Due to the rapid decay of the magnetic component of the signal emitted by one of the interrogation transmitters it is possible to ensure that the respective signal will be received only by the nearest wheel electronics. This greatly simplifies the process of relating the identifying signals of the wheel electronics to a given wheel position. In order to learn which identifying signal relates to which wheel position, the evaluation circuit sequentially causes the wheel electronics at the respective wheel position, via the respective interrogation transmitter, to emit their identifying signal. If, for example, the interrogation transmitter associated to the left front wheel is caused to emit an interrogation signal, then that interrogation signal is received only by the wheel electronics arranged in the left front wheel so that, consequently, only that unit will respond by sending its identifying signal. The identifying signal received in response to an interrogation signal transmitted by the transmitter associated to the left front wheel will, therefore, relate to the left front wheel. This permits the evaluation circuit to know within a matter of seconds after the start of a vehicle which identifying signals relate to which wheel positions. This advantageously ensures that even after a tire has been changed monitoring of the tire pressure will be possible already at the start of the vehicle—or even before.

One could now operate the interrogation transmitter at a firmly preset frequency of 125 kHz, for example. However, due to unavoidable production tolerances and, above all, the electromagnetic boundary conditions set by the mounting position and other environmental influences, it is very difficult to predict the resonance frequency of the oscillating circuit in the mounted condition on the vehicle. If the interrogation transmitter were to be operated at a firmly preset frequency of 125 kHz, for example, the interrogation transmitter, therefore, probably would not be operated at its resonance frequency, but rather at a deviation from that frequency of, typically, up to ±50 kHz. However, operating the interrogation transmitter at a frequency deviating from its resonance frequency would cause its power consumption to rise substantially. If an interrogation transmitter having a resonance frequency of 100 kHz is operated at 150 kHz, for example, current intensities in the range of 500 to 1000 mA may be required. This leads, however, to undesirable loading of the vehicle battery. By providing an amplifier in the oscillating circuit so that the amplifier output, the transmitting antenna and the amplifier input are connected in series, and by coupling back the amplifier input and the amplifier output, it is achieved that the oscillating circuit will always oscillate at its resonant frequency. This advantageously considerably reduces the power consumption of the interrogation transmitter so that the vehicle battery will be loaded only insignificantly and the tire pressure can be monitored over extended periods of time even in a parked vehicle.

Preferably, there is provided in the oscillating circuit a comparator which transforms a voltage applied to its comparator input and varying over time to a square-wave voltage. For this purpose, the comparator compares the voltage applied to its input with a predetermined zero value. When that zero value is exceeded, the comparator sets its comparator output to high, otherwise, if it is not, to low voltage so that over time a square-wave voltage is obtained. Such a comparator therefore serves to excite the oscillating circuit by a square-wave voltage, with the advantageous result that leakage power is reduced. This makes it possible to reduce the current consumption of the interrogation transmitter still further.

The radiator of the interrogation transmitter, being the transmission antenna, is preferably designed as rod antenna, especially as a ferrite rod antenna. This feature provides the advantage that the interrogation and/or control signals can be irradiated with high directivity. For space reasons, the receiver in the wheel electronics is designed as one-dimensional antenna, i.e. as a coil. The high directivity of a rod antenna, especially of a ferrite rod antenna, therefore provides good utilization of the transmission capacity and contributes still further to achieving current-saving operation. Preferably, the radiator contributes predominantly to the effective resistance of the oscillating circuit. For, if the radiator is the determining element of an oscillating circuit of high Q, for example of a Q of 20 or more, then the oscillating circuit will radiate in a very narrow frequency range only, which likewise contributes towards reducing the energy consumption in operation.

BRIEF DESCRIPTION OF THE FIGURES

Further details and advantages of the invention will be described hereafter by way of one embodiment as an example, with reference to the attached drawing in which.

DETAILED DESCRIPTION OF THE FIGURES

Figure 1:
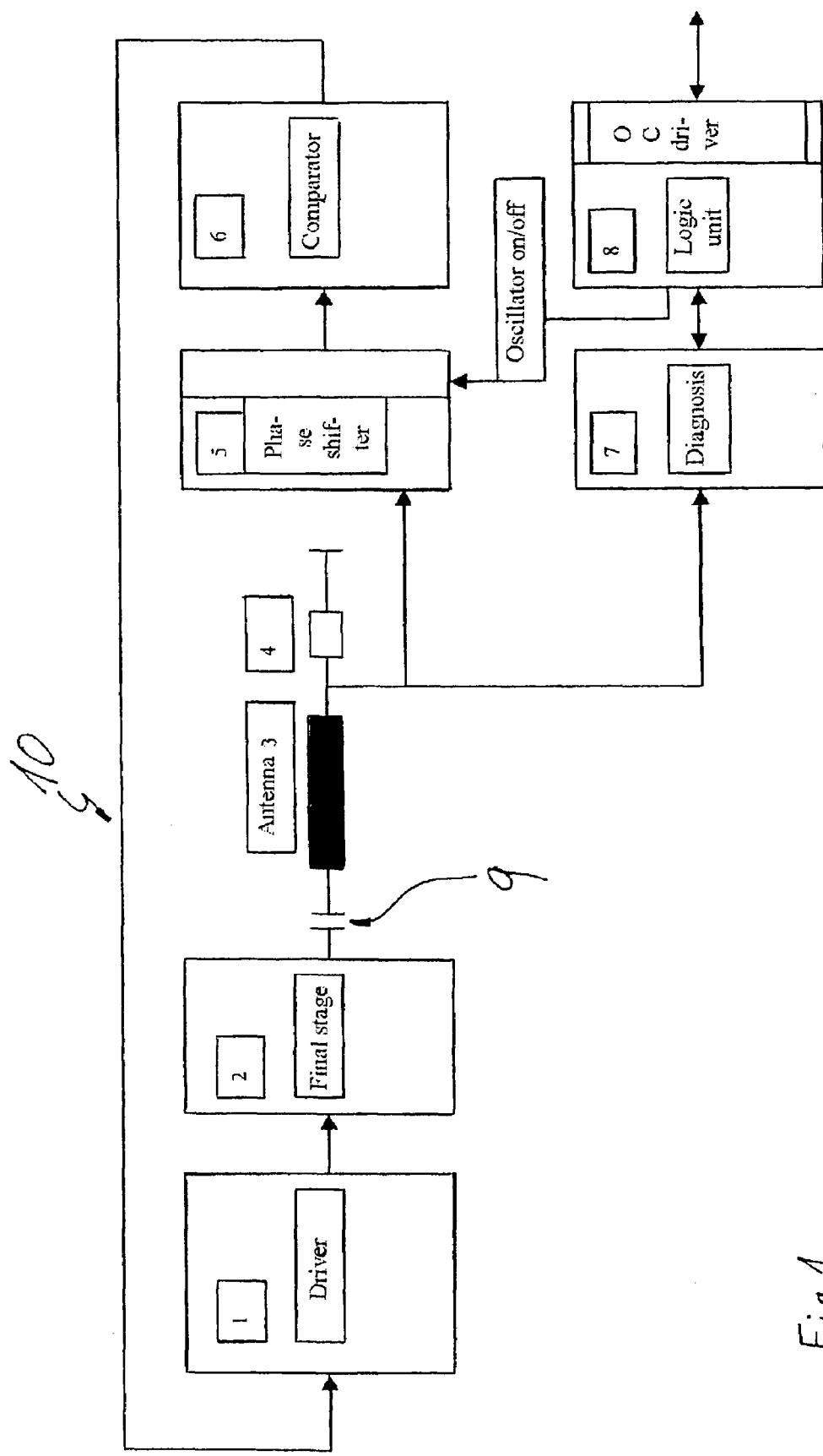
FIG. 1 shows a block diagram of an oscillating circuit for use in a system according to the invention.

The essential components of the block diagram of the transmitter for the transmission of interrogation and/or start signals, shown in FIG. 1, consist in the capacitor 9, the radiator 3 designed as ferrite rod antenna, the phase shifter 5, the comparator 6, the driver 1 and the associated final stage 2, which together form an oscillating circuit 10 in the form of a series-resonant circuit. The driver 1 and the final stage 2 act as an amplifier for amplifying the electromagnetic oscillations in the oscillating circuit designed as series-resonant circuit. The output of the final stage 2, i.e. the amplifier output, is coupled back to the input of the driver, i.e. the driver input. This has the effect that the oscillating circuit will always oscillate at its resonant frequency only, which advantageously minimizes its power consumption.

The driver 1 and the final stage 2 cause a phase shift between current and voltage of approximately 90°, which is compensated by the phase shifter 5. The series-resonant circuit contains the comparator 6, which transforms a sinusoidal voltage applied to its input to a square-wave voltage. To this end, the comparator 6 compares the voltage applied to its input with a predetermined zero value or with a mean value. When the predetermined zero value is exceeded, the output of the comparator is set to a voltage of, for example, 12 Volt, otherwise to a lower voltage of, for example, 0 Volt so that a sinusoidal voltage is transformed to a square-wave voltage. It is ensured in this way that the transmitter current is determined solely be the resonant circuit of the antenna so that, consequently, it does not comprise any undesirable harmonics. And the leakage power is likewise limited to a minimum. However, there is also the possibility to design the series-resonant circuit without a comparator 6 and to directly apply to the driver input the sinusoidal voltage supplied by the phase shifter 5, rather than a square-wave voltage. This would, however, present the disadvantage of somewhat higher power leakage and a greater amount of undesirable harmonics.

The radiator 3 is a ferrite rod antenna. Apart from the electromagnetic boundary conditions of the installed position, for example in the wheel case of the vehicle, which can be predicted either not at all or only with difficulty, the resonance frequency of the resonant circuit 10 is essentially determined by the radiator 3. The oscillating circuit 10, designed as series-resonant circuit, has a quality Q of, preferably, at least 20 so that the transmitter power can be preset very well. This is important in order to ensure that the signals emitted by the transmitter will, on the one hand, reliably reach the wheel electronics in the respective tire, but will on the other hand not be received by wheel electronics arranged in a wheel in a further remote position. Since, contrary to the resonance frequency, the quality Q of the resonant circuit 10 is essentially dependent on the mounting position, it can be preset very well so that the transmitter power and the coverage of the transmitter can be defined according to the particular requirements.

The current flowing through the radiator 3 is measured by a current meter not shown, and is evaluated by a diagnostic unit 7. A logic unit 8 monitors the operation of the oscillating circuit 10, based on the data provided to it by the diagnostic unit 7, and switches it on and off as needed by control signals supplied to the phase shifter 5. The logic unit 8 is connected via an open collector driver to a central processing unit (not shown) mounted in or on the vehicle, and is addressed by the latter to initiate the emission of the interrogation and/or control signals.

In the case of the embodiment illustrated in FIG. 1 the current values measured are derived for the diagnostic unit 7 immediately behind the radiator 3. Although it would be possible, in principle, to measure the current at any point in the oscillating circuit 10, it is of advantage to take these measurements as close as possible to the radiator 3. One obtains in this way the most reliable and most exact measured values relating to the current across the radiator 3 and, thus, the transmitter power. Especially, it is possible in this way to diagnose possible defects and deviations from the nominal power most rapidly and most reliably.

The invention claimed is:

1. A system for monitoring and wireless signaling of a pressure or a change of pressure in pneumatic tires on vehicles, comprising:
    wheel electronics that are disposed inside the pneumatic tires and are provided with a battery as a power source, the electronics comprising a pressure sensor for measuring the pressure or the change of pressure, a RF-transmitter for transmitting a signal derived from the signal of the pressure sensor, and a first receiver for receiving wireless interrogation signals and/or control signals,
    a second receiver arranged in or on the vehicle and which receives the signal derived from the signal of the pressure sensor,
    a device for signaling to the driver information relating to the pressure or change of pressure,
    and transmitters for emitting interrogation signals and/or control signals, the transmitters being disposed, respectively, individually near each running wheel and having a transmission frequency of less than 1 MHz, said transmitter for emitting interrogation and/or control signals comprising an oscillating circuit comprising a radiator and an amplifier having an amplifier input and an amplifier output, the amplifier output being coupled back to the amplifier input via the radiator.

2. The system as defined in claim 1, wherein the oscillating circuit further comprises a comparator which transforms a voltage applied to its input, which varies over time, to a square-wave voltage.

3. The system as defined in claim 2, wherein the oscillating circuit is a series-resonant circuit.

4. The system as defined in claim 2, wherein the radiator is arranged in the wheel case of the vehicle.

5. The system as defined in claim 2, wherein the radiator is a ferrite rod antenna.

6. The system as defined in claim 2, wherein the oscillating circuit further comprises an active resistance to which the radiator provides the predominant contribution.

7. The system as defined in claim 2 further comprising a current meter for measuring the current flowing through the radiator and for supplying measured values to a logic circuit.

8. The system as defined in claim 2, wherein the oscillating circuit has a Q value of at least 20.

9. The system as defined in claim 2, wherein the transmission frequency of the transmitter for emitting interrogation and/or control signals is 50 to 300 kHz.

10. The system as defined in claim 1 wherein the oscillating circuit is a series-resonant circuit.

11. The system as defined in claim 1 wherein the radiator is arranged in the wheel case of the vehicle.

12. The system as defined in claim 1 wherein the radiator is a ferrite rod antenna.

13. The system as defined in claim 1 wherein the oscillating circuit further comprises an active resistance to which the radiator provides the predominant contribution.

14. The system as defined in claim 1 further comprising a current meter for measuring the current flowing through the radiator and for supplying measured values to a logic circuit.

15. The system as defined in claim 14, wherein the oscillating circuit has a Q value of at least 20.

16. The system as defined in claim 1 wherein the oscillating circuit has a Q value of at least 20.

17. The system as defined in claim 1 wherein the transmission frequency of the transmitter for emitting interrogation and/or control signals is 50 to 300 kHz.

18. The system as defined in claim 17, wherein the transmission frequency of the transmitter for emitting interrogation and/or control signals is 70 to 150 kHz.

19. A system for monitoring and wireless signaling of a pressure or
    a change of pressure in pneumatic tires on vehicles, comprising:
    wheel electronics disposed inside the pneumatic tires and provided with a battery as a power source, the electronics comprising a pressure sensor for measuring the pressure or the change of pressure,
    a RF-transmitter for transmitting a signal derived from the signal of the pressure sensor,
    a first receiver for receiving wireless interrogation signals and/or control signals,
    a second receiver arranged in or on the vehicle and which receives the signal derived from the signal of the pressure sensor,
    a device for signaling to the driver information relating to the pressure or change of pressure, and
    transmitters for emitting interrogation signals and/or control signals, the transmitters being disposed, respectively, individually near each running wheel and having a transmission frequency of less than 1 MHz, said transmitter for emitting interrogation and/or control signals comprises an oscillating circuit,
    the oscillating circuit comprising a radiator arranged in the wheel case of the vehicle, an amplifier having an amplifier input and an amplifier output, the amplifier output being coupled back to the amplifier input via the radiator, a comparator which transforms a voltage applied to its input, which varies over time, to a square-wave voltage, wherein the oscillating circuit is a series-resonant circuit, an active resistance to which the radiator provides the predominant contribution, the oscillating circuit has a Q value of at least 20,
    a current meter for measuring the current flowing through the radiator and for supplying measured values to a logic circuit,
    wherein the transmission frequency of the transmitter for emitting interrogation and/or control signals is 50 to 300 kHz.

20. The system as defined in claim 19 wherein the radiator is a ferrite rod antenna and the transmission frequency of the transmitter for emitting interrogation and/or control signals is 70 to 150 kHz.

* * * * *